United States Patent Office 3,459,754
Patented Aug. 5, 1969

3,459,754
2-ALKANOYLAMIDO-1-HYDROXYPYRROLO
[1,2-a]QUINAZOLINES
Stanley C. Bell, Narberth, Pa., assignor to American
Home Products Corporation, New York, N.Y., a corporation of Delaware
No Drawing. Filed Feb. 9, 1967, Ser. No. 614,809
Int. Cl. C07d 51/48; A61k 27/00, 21/00
U.S. Cl. 260—256.4                    10 Claims

ABSTRACT OF THE DISCLOSURE

By reacting benzoyl acetanilides with cyano compounds, there are formed 2-alkanoylamido-1-hydroxypyrrolo[1,2-a]quinazolines which are therapeutically efficacious as antibiotics, depressants and mydriatics.

---

This invention relates to new and novel quinazolines as well as to a method for their preparation. In particular, this invention is concerned with 2-alkanoylamido-1-hydroxypyrrolo[1,2-a]quinazolines which have pharmacological activity.

The compounds which are included within the scope of this invention are represented by the following formula:

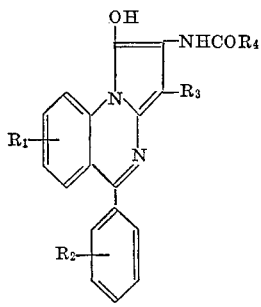

wherein $R_1$ and $R_2$ are both selected from the group consisting of hydrogen, halogen, lower alkyl and lower alkoxy; $R_3$ is selected from the group consisting of carbo(lower)alkoxy and di(lower)alkylphosphono and $R_4$ is lower alkyl. Typical examples thereof are: 2-acetamido-7-chloro-1-hydroxy-5-phenylpyrrolo[1,2-a]quinazoline-3-phosphonic acid, diethyl ester; 2-acetamido-7-chloro-1-hydroxy-5-phenylpyrrolo[1,2-a]quinazoline-3-carboxylic acid, ethyl ester; 1-hydroxy-5-phenyl-2-propionamidopyrrolo[1,2-a]quinazoline-3-phosphonic acid, diethyl ester; and 2-acetamido-7-bromo-1-hydroxy-5-(4-tolyl)-pyrrolo[1,2-a]quinazoline-3-carboxylic acid, butyl ester.

The new and novel process of this invention is illustrated by the following reaction scheme:

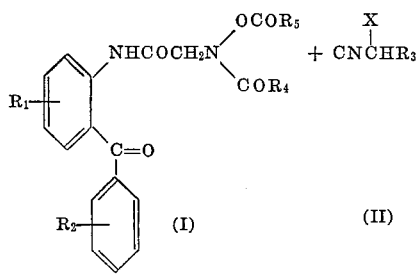

wherein $R_1$, $R_2$, $R_3$ and $R_4$ are defined as above, $R_5$ is lower alkyl and X is selected from the group consisting of sodium and potassium. This reaction is effected by reacting a benzoyl acetanilide (I) with at least two molar equivalents of a cyano compound (II) in a reaction-inert organic solvent until the reaction is complete. Preferably this reaction is conducted in dimethylformamide for a period of about one-half hour. The structures designated as III and IV are postulated unisolated intermediates which are herein included to describe the probable mechanism for this reaction.

When the reaction is complete, the reaction mixture is acidified with an acid and the precipitated product (V) is separated by conventional methods, such as, filtration and recrystallization from a suitable solvent, e.g. an alkanol to afford the appropriate 2-alkanoylamido-1-hydroxypyrrolo[1,2-a]quinazoline (V).

The benzoyl acetanilides used as starting materials to synthesize the compounds of the present invention are prepared by the procedure described in copending U.S. patent application Ser. No. 456,533, entitled "Acetamides and Their Preparation" filed on May 17, 1965, now U.S. Patent No. 3,382,243. The sodium or potassium salts of the cyano compounds employed in the present invention are readily prepared by procedures well known to those skilled in the art, as exemplified in the examples, e.g. reaction with sodium hydride, potassium hydride, sodium ethoxide, sodium methoxide, potassium methoxide and potassium ethoxide. The cyano compounds are either commercially available or are readily prepared by standard chemical reactions. By the term "reaction-inert organic solvent" as employed herein is meant any organic solvent which will dissolve the reactants and not interfere with their interaction. Typical examples of such solvents are: dimethylformamide, dimethylacetamide, xylene, toluene and benzene. By "acid" as employed herein is meant any organic or mineral acid which will neutralize the reaction mixture, such as, acetic acid, hydrochloric acid, hydrobromic and sulfuric acid etc.

Any time and temperature ranges utilized in the above mentioned reaction are not critical and simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time.

In accord with the present invention, the 2-alkanoyl-amido-1-hydroxypyrrolo[1,2 - a]quinazolines (V) herein described have been found to possess interesting pharmaceutical properties which render them useful as synthetic medicinals. More particularly, these compounds, in standard pharmacological tests, have exhibited utility as antibiotic, depressant and mydriatic agents.

When the compounds of this invention are employed as described above, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 10 mg. to about 400 mg. per day, although as aforementioned variations will occur. However, a dosage level that is in the range of from about 50 mg. to about 300 mg. per day is most desirably employed in order to achieve effective results.

The following examples are given by way of illustration and are not to be construed as limitations of this invention, many variations of which are possible without departing from the scope and spirit thereof.

Example I

To a mixture of 4.8 g. of 50% sodium hydride in 100 ml. of dimethylformamide, there is added 18 g. of diethyl cyanomethylphosphonate with stirring. After the vigorous reaction subsides there is added 10 g. of 2-[acetyl(hydroxy)amino]-2'-benzoyl-4'-chloroacetanilide, acetate with cooling. After a half hour the dark reaction mixture is diluted with water and acidified with acetic acid. The aqueous layer is decanted from the dark residue which is then recrystallized twice from ethanol forming long yellow needles of 2-acetamido-7-chloro-1-hydroxy - 5 - phenyl-pyrrolo[1,2-a]quinazoline-3-phosphonic acid, diethyl ester, M.P. 195–196° C.

Analysis.—Calcd. for $C_{23}H_{23}ClN_3O_5P$: C, 56.63; H, 4.75; N, 8.61; Cl, 7.27. Found: C, 56.26; H, 4.41; N, 8.98; Cl, 7.1.

In a similar manner, reacting 2-[propionyl(hydroxy)amino]-2'-benzoylacetanilide, propionate with diethyl cyanomethylphosphonate in the presence of sodium ethoxide there is obtained 1-hydroxy-5-phenyl - 2 - propionamido-pyrrolo[1,2-a]quinazoline - 3 - phosphonic acid, diethyl ester.

Example II

To a mixture of 10.0 g. of 25% potassium hydride in 100 ml. of dimethylacetamide, there is added 20 g. of dimethyl cyanomethylphosphonate with stirring. After the reaction has subsided, there is added 10.0 g. of 2-[acetyl(hydroxy)amino]-2' - (4-chlorobenzoyl) - 4'-methylacetanilide, propionate with cooling. After two hours the reaction mixture is diluted with water and acidified with hydrochloric acid. The aqueous layer is decanted from the residue which is then recrystallized from methanol to afford 2 - acetamido-5-(4-chlorophenyl)-1-hydroxy-7-methylpyrrolo[1,2-a]quinazoline - 3 - phosphonic acid, dimethyl ester.

Similarly, reacting dipropyl cyanomethylphosphonate with 2 - [acetyl(hydroxy)amino]-2'-(4-methoxybenzoyl)-acetanilide, acetate there is obtained 2-acetamido-1-hydroxy-5-(4-methoxyphenyl)pyrrolo[1,2 - a]quinazoline-3-phosphonic acid, dipropyl ester.

Example III

Repeating the procedure of Example I to react ethyl cyanoacetate and 2-[acetyl(hydroxy)amino]-2'-benzoyl-4'-chloroacetanilide, acetate, there is obtained 2-acetamido-7-chloro-1-hydroxy-5-phenylpyrrolo[1,2-a]quinazoline-3-carboxylic acid, ethyl ester.

Analysis.—Calcd. for $C_{22}H_{18}ClN_3O_4$: C, 62.34; H, 4.28; N, 9.91; Cl, 8.30. Found: C, 62.53; H, 4.51; N, 9.77; Cl, 8.6.

In a similar manner, reacting butyl cyanoacetate with 2-[acetyl(hydroxy)amino] - 4' - bromo-2'-(4-tolyl)acetanilide acetate there is obtained 2-acetamido-7-bromo-1-hydroxy-5-(4-tolyl)pyrrolo[1,2-a]quinazoline-3-carboxylic acid, butyl ester.

Example IV

When the procedure of Examples I–III is repeated to react a benzoyl acetanilide with an appropriate cyano compound, the following products are obtained:

2-acetamido-1-hydroxy-9-methyl-5-phenylpyrrolo[1,2-a] quinazoline-3-phosphonic acid, dimethyl ester;

5-(4 - bromophenyl)-butyramido - 1 - hydroxypyrrolo [1,2-a]quinazoline-3-carboxylic acid, methyl ester;

2-acetamido-8-ethyl-5-(3 - fluorophenyl)-1-hydroxypyr-rolo[1,2-a]quinazoline-3-carboxylic acid, ethyl ester;

2-acetamide-7-ethoxy-1-hydroxy-5-phenylpyrrols[1,2-α] quinazoline-3-carboxylic acid, ethyl ester;

2-acetamido-1-hydroxy - 7 - methoxy-5-phenylpyrrolo [1,2-a]quinazoline-3-carboxylic acid, methyl ester;

2-acetamido-5-(4-ethylphenyl)-1-hydroxypyrrolo[1,2-a]quinazoline-3-carboxylic acid, methyl ester; and 2 - acetamido-5-(4-ethoxyphenyl) - 1 - hydroxypyrrolo[1,2-a]quinazoline-3-phosphonic acid, dimethyl ester.

What is claimed is:

1. A compound selected from the group consisting of those having the formula:

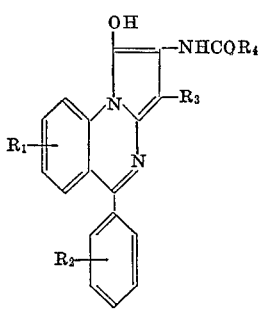

wherein $R_1$ and $R_2$ are both selected from the group consisting of hydrogen, halogen, lower alkyl and lower alkoxy; $R_3$ is selected from the group consisting of carbo(lower)alkoxy and di(lower)alkylphosphono and $R_4$ is lower alkyl.

2. A compound as described in claim 1 which is: 2-acetamido-7-chloro-1-hydroxy - 5 - phenylpyrrolo[1,2-a]quinazoline-3-phosphonic acid, diethyl ester.

3. A compound as described in claim 1 which is: 2-acetamido-7-chloro-1-hydroxy - 5 - phenylpyrrolo[1,2-a]quinazoline-3-carboxylic acid, ethyl ester.

4. A compound as described in claim 1 which is: 1-hydroxy-5-phenyl-2-propionamidopyrrolo[1,2-a]quinazoline-3-phosphonic acid, diethyl ester.

5. A compound as described in claim 1 which is: 2-acetamido-5-(4-chlorophenyl)-1-hydroxy - 7 - methylpyrrolo[1,2-a]quinazoline-3-phosphonic acid, dimethyl ester.

6. A compound as described in claim 1 which is: 2-acetamido-1-hydroxy-5-(4-methoxyphenyl)pyrrolo[1,2-a]quinazoline-3-phosphonic acid, dipropyl ester.

7. A compound as described in claim 1 which is: 2-acetamido-7-chloro-1-hydroxy - 5 - phenylpyrrolo[1,2-a]quinazoline-3-carboxylic acid, ethyl ester.

8. A compound as described in claim 1 which is: 2-acetamido-7-bromo-1-hydroxy-5-(4 - tolyl)pyrrolo[1,2-a]quinazoline-3-carboxylic acid, butyl ester.

9. A process for the preparation of compound having the formula:

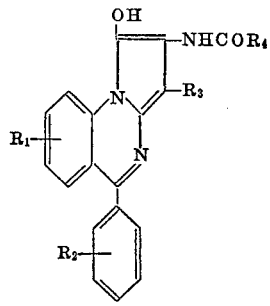

wherein $R_1$ and $R_2$ are both selected from the group consisting of hydrogen, halogen, lower alkyl and lower alkoxy; $R_3$ is selected from the group consisting of carbo(lower)alkoxy and di(lower)alkylphosphono; and $R_4$ is lower alkyl; which comprises contacting a benzoyl acetanilide of the formula:

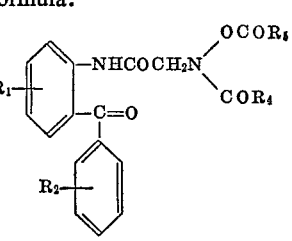

wherein $R_1$, $R_2$ and $R_4$ are defined as above, and $R_5$ is lower alkyl with at least two molar equivalents of a cyano compound of the formula:

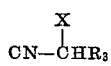

wherein $R_3$ is defined as above, and X is selected from the group consisting of sodium or potassium, in a reaction-inert organic solvent.

10. A process as described in claim 9 wherein the reaction-inert organic solvent is dimethylformamide.

References Cited

UNITED STATES PATENTS 2,984,665   5/1961   Bortnick et al. _____ 260—256.4
3,271,400   9/1966   Bernstein et al. _____ 260—256.4

NICHOLAS S. RIZZO, Primary Examiner

R. J. GALLAGHER, Assistant Examiner

U.S. Cl. X.R.

260—326, 465; 424—200, 251